Nov. 7, 1961  H. L. POTTER  3,007,753
BEARING LOCK
Filed May 15, 1957

INVENTOR
HOWELL L. POTTER
BY
ATTORNEYS

3,007,753
BEARING LOCK
Howell L. Potter, New Britain, Conn., assignor to The Fafnir Bearing Company, New Britain, Conn., a corporation of Connecticut
Filed May 15, 1957, Ser. No. 659,362
2 Claims. (Cl. 308—236)

My invention relates to a bearing lock, particularly adapted for locking a bearing ring of an antifriction bearing to a shaft.

It is an object of the invention to provide an improved lock for a bearing ring on a shaft.

It is a more specific object to provide an improved bearing lock of the charater indicated, which will bind very securely on the shaft and bearing ring and will be free of any sticking due to corrosion.

It is a further object to provide an improved bearing lock of the character indicated, which will lock the bearing ring securely to a shaft and is so constructed and arranged that the bearing ring may be driven from the shaft even while locked without any scoring of the shaft or the bearing ring.

Another object is to provide an improved bearing lock of the character indicated, wherein the bearing ring and locking part may be unitarily assembled and slipped on to the shaft as a unit and the ring locked securely by a mere rotation thereof on the shaft.

It is still another object to provide an improved bearing lock of the character indicated, wherein the bearing ring may be locked to the shaft by a manual turning of the bearing lock which is exposed at the outside of the bore of the ring.

Other objects and various features of novelty and invention will be hereinafter pointed out or will become apparent to those skilled in the art.

Briefly stated, in a preferred form of the invention, the bearing ring to be locked to a shaft may be the inner ring of an antifriction bearing, including inner and outer bearing rings with interposed antifriction bearing members. The inner ring, within the bore, has an eccentric bore therein, which eccentric bore, in the preferred form, may be in the form of a groove between the ends of the ring or may constitute a counterbore in one end of the ring. This eccentric bore is of a size and design to receive an eccentric slightly resilient locking ring which is continuous circumferentially and which is of a size to fit loosely within the eccentric bore. It is preferable to have the bore of the locking ring slightly smaller than the bore through the bearing ring so that when the bearing ring is pushed on to a shaft, the eccentric locking ring may be stretched over the shaft and bind slightly thereon so that thereafter the bearing ring may be rotated relatively to the locking ring and the shaft so as to cause the locking ring to bind tightly in the eccentric bore and on the shaft. The locking ring is preferably of non-metallic material which may be broadly referred to as a plastic, and may cover various materials, including nylon. Thus, the bearing ring may be securely locked on the shaft and since nylon and the like is non-corrodible, the parts will not stick and can be unlocked upon proper relative rotation of the ring and shaft. Furthermore, if it becomes necessary to drive the inner ring from the shaft even when locked by the nylon locking ring, there will be no scoring of the shaft nor of the bearing ring bore.

In the drawings, which show, for illustrative purposes only, preferred forms of the invention;

Figure 1:
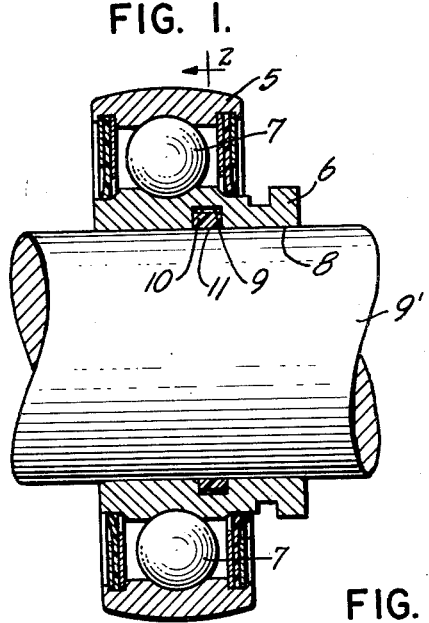
FIG. 1 is a diametral axial sectional view through a bearing, illustrating features of the invention.
Figure 2:
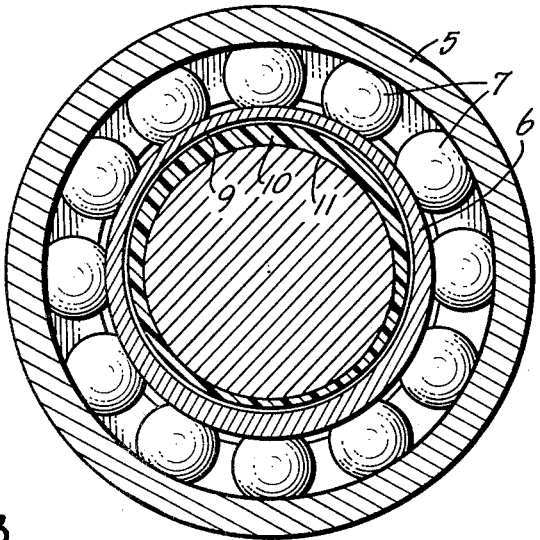
FIG. 2 is a sectional view, taken substantially in the plane of the line 2—2 of FIG. 1.
Figure 3:
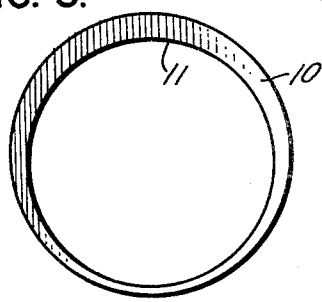
FIG. 3 is an axial view in elevation of the locking ring illustrated in FIGS. 1 and 2.

In the form shown in FIGS. 1, 2 and 3, the bearing consists of an outer ring 5, inner ring 6 with interposed antifriction bearing members, such as balls 7. If desired, seals may be provided at one or both sides of the balls. The inner ring has a cylindrical bore 8 to fit a shaft 9' which has the usual fit in the bore. The bearing ring 6, within the bore 8, has an eccentric bore 9 removed from the ends of the ring and constituting an eccentric groove turned in the inner ring within the bore 8. The eccentric bore 9 is designed to receive the locking ring 10 which is continuous circumferentially and is of a size to substantially fit, though preferably somewhat loosely, in the eccentric bore 9. In the preferred form, the bore 11 through the ring 10 is slightly less than the diameter of the bore 8 in the ring so the ring 10 may be stretched over and bind slightly upon a shaft when the bearing is pushed on to a shaft. The locking ring 10 is of non-metallic material, preferably of material which may be called plastic, and specifically in one form consisting of nylon. This material, or any material proper for such a ring, must be somewhat resilient and nylon and the like has proven entirely satisfactory.

The ring 10 is distorated slightly so as to be inserted in the eccentric bore 9, and when in place will spring out and be held in that bore 9. Thus, the ring 10 will be unitarily carried with the ring 6 ready for application to a shaft. When the bearing is to be put on a shaft and locked, it is simply pushed over the shaft, and if the nylon ring 10 is in proper position of rotation in its eccentric bore 9, it will simply be stretched over the shaft and bind lightly thereon, due particularly to the fact that the bore 11 through the nylon ring 10 is slightly less in diameter than the bore 8 so that it will fit rather tightly over the outer surface of the shaft. If the ring 10 is not in its proper position of rotation, the ring 6 may be rotated slightly while the locking ring 10 is frictionally held in place on the shaft, and when the parts are in a proper position, they will slide easily on to the shaft. When the bearing has been moved to its desired position, the inner ring will be given a partial rotation relatively to the shaft and the ring 10 which is frictionally held on the shaft. Thus the ring 10 will be forced into a more restricted region of the eccentric bore 9 and thus very securely locked on both the shaft 10 and in the eccentric bore 9, and thus securely locking the ring in place.

Figure 4:
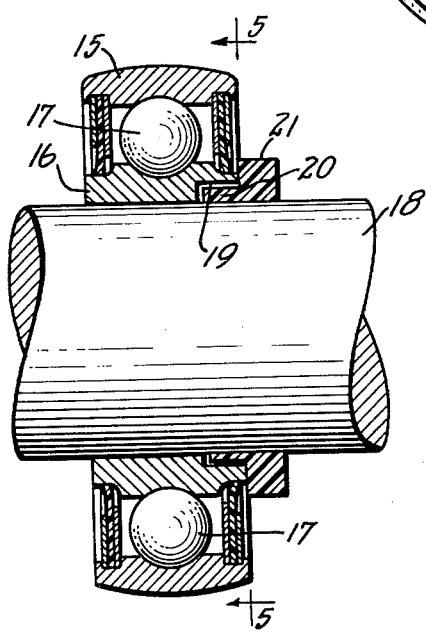
FIG. 4 is a view similar to FIG. 1 illustrating a slight modification.
Figure 5:
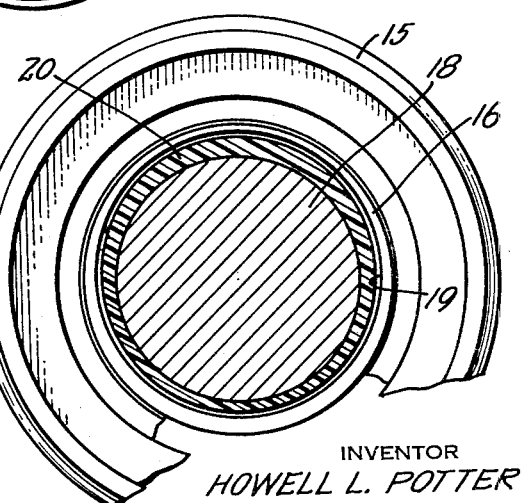
FIG. 5 is a sectional view, taken substantially in the plane of the line 5—5 of FIG. 4.

In the form shown in FIGS. 4 and 5, the bearing may be substantially the same as heretofore described, and consists of an outer ring 15 and inner ring 16 with interposed antifriction bearing members, such as balls 17. The bearing is designed to fit and be locked upon a shaft 18. The inner ring has an eccentric bore therein which instead of being a groove as heretofore described, is in the form of an eccentric counterbore 19 in one end of the ring 16. This eccentric counterbore 19 may be of substantially the same shape as the eccentric bore or groove heretofore described, The locking ring 20 is eccentric and substantially fits within the eccentric counterbore 19. The eccentric locking ring 20 preferably has an enlargement or grip portion 21 at the outside of the counterbore so that when the bearing ring 16 is slipped on to the shaft and moved to its desired position, the grip portion 21 may be grasped so as to rotate the ring 20 in the counterbore 19 and thus cause it to grip both the shaft and the inside of the counterbore 19. Any further creeping or rotation of the ring 16 in the same direction will cause the eccentric locking ring 20 to bind more tightly, as will be understood.

The principal difference between the two forms illustrated, is that in the form shown in FIG. 4 the locking ring can actually be manipulated from the outside of the bearing ring, while in the form shown in FIGS. 1 and 2, the locking ring 10 is concealed and cannot be handled manually from the outside.

It will be seen that I have provided improved locking means for locking a bearing ring to a shaft. The locking ring is of slightly resilient material and relative rotation between the bearing ring and the shaft or any creeping of the inner ring on the shaft will cause the latter to be more tightly locked to the shaft. Since nylon or the like is non-corrodible and any other non-metallic material used should be also non-corrodible, there is little danger that the locking parts will stick due to corrosion, such as is possible with metallic bearing rings and locking rings. Furthermore, if it should become necessary to drive the bearing ring from the shaft, the soft material of which the locking ring is formed will not score either the shaft or the inside of the bearing ring. The locking rings in both cases are continuous circumferentially so that they are stretched slightly when the bearing ring is put on to a shaft, thus facilitating the locking action by a mere rotation of the bearing ring.

While the invention has been described in considerable detail and preferred forms illustrated, it is to be understood that various changes and modifications may be made within the scope of the invention as defined in the appended claims.

I claim:

1. In combination, a shaft, a bearing comprising inner and outer bearing rings with interposed antifriction bearing members, said inner ring having a bore fitted to said shaft, said inner ring within said bore having an eccentric groove to receive a locking ring, a circumferentially continuous resilient plastic locking ring carried by said shaft at the axial location of said eccentric groove, said locking ring having a bore of lesser unstressed diameter than the diameter of said shaft, whereby said ring will circumferentially continuously cling to said shaft, said locking ring having an outer eccentric surface fitting loosely within said eccentric groove, whereby when said inner ring is rotated relatively to said shaft said eccentric locking ring will bind on said shaft and in said eccentric groove for locking said inner ring to said shaft.

2. In combination, a shaft, an antifriction bearing comprising an inner bearing ring having a bore receiving said shaft, said inner ring within said bore having an eccentric groove, a nylon locking ring in said eccentric groove, said nylon locking ring being of eccentric external contour and of a size to fit loosely within said eccentric groove and being circumferentially continuous, said locking ring having an unstressed bore diameter less than the diameter of said shaft, whereby said locking ring inherently circumferentially continuously frictionally engages said shaft, and whereby upon rotation of said bearing ring on said shaft, said nylon locking ring will bind in said eccentric groove in said bearing ring and on said shaft to lock said bearing ring on said shaft.

References Cited in the file of this patent

UNITED STATES PATENTS

| | | |
|---|---|---|
| 954,957 | Harriman et al. | Apr. 12, 1910 |
| 2,118,885 | Hughes | May 31, 1938 |
| 2,222,334 | Brouwer | Nov. 19, 1940 |
| 2,273,379 | Searles | Feb. 17, 1942 |
| 2,412,409 | Martin | Dec. 10, 1946 |
| 2,837,382 | Schaefer | June 3, 1958 |

OTHER REFERENCES

"Nylon in Bearings and Gears" (Wall), published in Product Engineering, July 1950 (pages 102–107 relied on).